Aug. 21, 1951      I. KANTOR      2,565,132
MARKET BAG
Filed Dec. 3, 1948
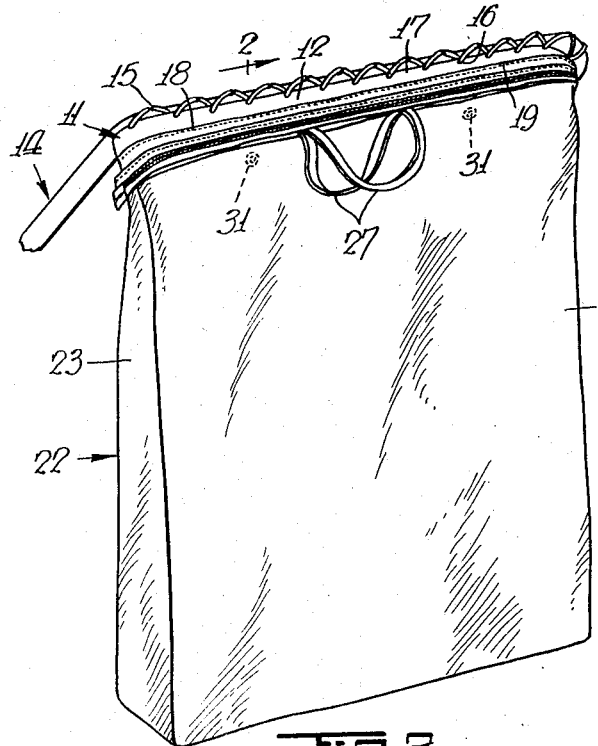
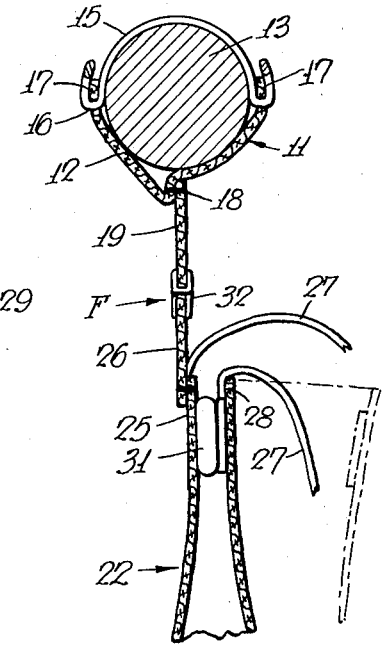
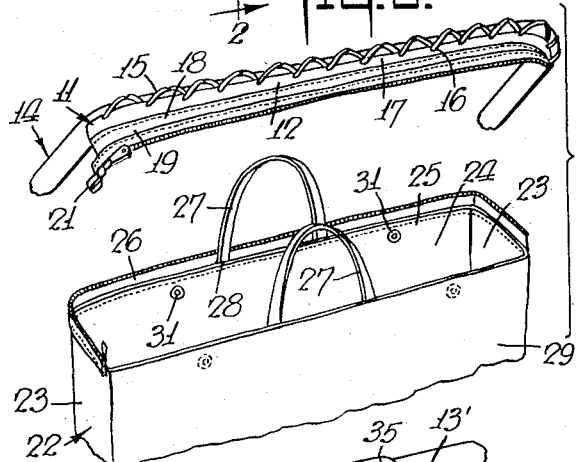
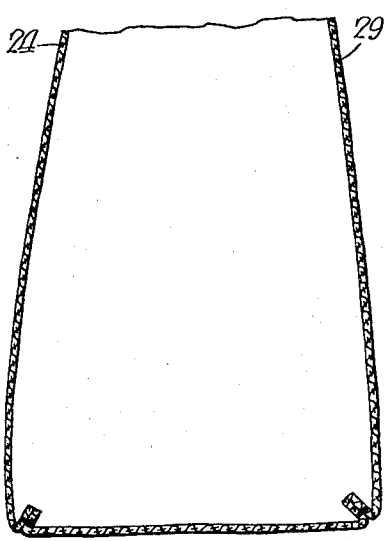
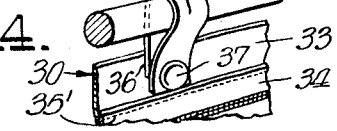
INVENTOR
*Irving Kantor*
BY
*Dean Fairbank & Hirsch*
ATTORNEYS Patented Aug. 21, 1951

2,565,132

UNITED STATES PATENT OFFICE 2,565,132

MARKET BAG

Irving Kantor, Brooklyn, N. Y.

Application December 3, 1948, Serial No. 63,258

6 Claims. (Cl. 224—42.46)

This invention relates to market bags more particularly of the type to be mounted on the handle bar of a baby carriage.

As conducive to a clear understanding of the invention it is noted that where the housewife goes shopping and places her purchases in the cab of the carriage in which she is wheeling her infant, they are likely to interfere with the comfort and safety of the child, and in addition the child may throw them out.

If to avoid such objections, resort is had to a market bag carried by hand it becomes awkward, tiring and hazardous for the housewife to wheel the baby carriage at the same time.

It is accordingly among the objects of this invention to provide a market bag that is light in weight, inexpensive in cost and simple to manufacture, that may quickly and readily be attached to the handle bar of the conventional baby carriage by even an unskilled housewife without need for any special tools, brackets or clamps, that will not interfere with the wheeling of such carriage, that will not decrease the space available for the infant in the cab of the carriage, and that may readily be removed from and remounted on such handle bar in but a few seconds.

According to the invention a carrier strip is provided which may be affixed to the handle bar of the carriage and a market bag is provided having fastening means thereon coacting with complementary fastening means on the carrier strip whereby the market bag may be detachably connected thereto.

In the accompanying drawings in which are shown one or more of various possible embodiments of the several features of the invention, Fig. 1 is a perspective view of the device mounted on the handle bar of a baby carriage, Fig. 2 is a vertical cross sectional view taken along line 2—2 of Fig. 1, and on a larger scale, Fig. 3 is an exploded fragmentary perspective view of the component parts of the device, and, Fig. 4 is a fragmentary perspective view on a smaller scale of another embodiment of the device.

Referring now to the drawings, as shown in Figs. 1 to 3, a bag carrier 11 is provided comprising a strip 12 desirably of heavy fabric, of length illustratively substantially equal to the length of the cross piece 13 of the handle bar 14 of a conventional baby carriage. Although any suitable means could be used to connect the bag carrier to such handle bar, in one embodiment of the device herein chosen to illustrate my invention, as shown in Fig. 2, the width of strip 12 is desirably slightly greater than one-half the circumference of cross piece 13 so that the strip 12 may straddle the lower portion of such cross piece 13. The strip 12 is thereupon affixed to cross piece 13 by means of a lace 15 which is threaded through a plurality of openings 16 spaced along the longitudinal edges 17 of strip 12 and passed over cross piece 13.

Affixed at its upper edge as by a line of stitching 18 along the outer face of strip 12 and extending longitudinally thereof, is a tape 19 which forms one-half of a conventional slide fastener F, said tape 19 desirably carrying slide member 21 thereon.

A market bag 22 desirably also of heavy fabric, is provided, on the side panels 23 and rear panel 24 of which along the upper edges 25 thereof is a tape 26 which forms the other half of the conventional slide fastener F. The bag 22 desirably has a pair of handles 27 affixed respectively as at 28 to the front panel 29 and to the rear panel 24 and a plurality of snap fasteners 31 are provided, the component parts of which are affixed to the inner faces of the front and rear panels adjacent the upper edges thereof whereby the upper portions of said panels may be releasably held together to close the mouth of the market bag 22.

To use the device, after the bag carrier 11 has been affixed to cross bar 13 in the manner heretofore described, the housewife may carry the bag in conventional manner by means of the handles 27 and after making her purchases and placing them inside the market bag 22, may close the mouth of the latter by pressing together the coacting portions of the snap fasteners 31.

The market bag 22 may then readily be connected to the bag carrier 11 in conventional manner by use of slide member 21 to join together the complementary teeth 32 on tapes 19 and 26. As the handles 27 are desirably of non-rigid material such as fabric or cord, they may readily be moved forward as shown in Figs. 1 and 2 so that they will not impede the movement of slide member 21.

In the embodiment of the device shown in Fig. 4, the bag carrier 30 desirably comprises a strip 33 of heavy fabric, of length substantially equal to the length of the cross piece 13' and having a slide fastener tape 34 affixed by a row of stitching 35' to the lower edge thereof. The strip 33 is affixed to cross piece 13' by means of a plurality of straps 35, only one of which is illustratively shown, and which is affixed at one end as by stitching as at 36 to the upper edge of strip 33 at right angles thereto. Strap 35 is of such length that it may be looped over the cross piece 13' and a snap fastener element 37 is desirably provided at the free end of the strap which co-acts with a complementary snap fastener element on the strip 33 to retain the bag carrier on the cross piece.

As the market bag connected to carrier 33 may be identical to the one shown in Figs. 1 to 3 and heretofore described, no further explanation thereof is deemed necessary.

With either of the devices heretofore described it is a relatively simple matter for the housewife to make her purchases, carry them from the store to the baby carriage in the market bag and connect such bag to the cross piece of the carriage handle bar. She may then transport even a relatively heavily loaded market bag without the slightest discomfort to herself or to the infant and at all times be free to devote her entire attention to the wheeling of the carriage.

Although the devices herein have been illustratively shown mounted on the handle bar of a carriage, it is within the scope of this invention to use the devices on other vehicles such as on the center brace of a bicycle.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A device of the character described to be mounted on the handle bar of a baby carriage, said device comprising a bag carrier member including an elongated strip having a plurality of openings along each of the longitudinal edges thereof, a lace threaded through said openings and around such handle bar detachably to connect said carrier member thereto, a market bag and complementary connector means on said elongated strip and said market bag whereby the latter may be detachably connected to the former.

2. A device of the character described to be mounted on the handle bar of a baby carriage, said device comprising a bag carrier member, including an elongated strip having a plurality of openings along each of the longitudinal edges thereof, a lace threaded through said openings and around such handle bar detachably to connect said carrier member thereto, a tape affixed to said elongated strip and extending longitudinally thereof, a market bag, a tape affixed to the upper edge of said market bag and extending longitudinally thereof and complementary connector means on said tapes whereby said market bag may be detachably connected to said carrier member.

3. A device of the character described to be mounted on the handle bar of a baby carriage, said device comprising a bag carrier member, including an elongated strip having a plurality of openings along each of the longitudinal edges thereof, a lace threaded through said openings and around such handle bar detachably to connect said carrier member thereto, a slide fastener tape affixed to said elongated strip and extending longitudinally thereof, a market bag, a complementary slide fastener tape affixed to the upper edge of said market bag and extending longitudinally thereof, and a slide member coacting with said complementary slide fastener tapes to connect the two whereby said market bag may be detachably connected to said carrier member.

4. As an article of manufacture a bag carrier member comprising an elongated strip having a plurality of openings along each of the longitudinal edges thereof, a lace threaded through said openings, a market bag and complementary connector means on said elongated strip and said market bag whereby the latter may be detachably connected to the former.

5. As an article of manufacture a bag carrier member comprising an elongated strip having a plurality of openings along each of the longitudinal edges thereof, a lace threaded through said openings, a tape affixed to said elongated strip and extending longitudinally thereof, a market bag, a tape affixed to the upper edge of said market bag and extending longitudinally thereof, and complementary connector means on said tapes whereby said market bag may be detachably connected to said carrier member.

6. As an article of manufacture a bag carrier member comprising an elongated strip having a plurality of openings along each of the longitudinal edges thereof, a lace threaded through said openings, a slide fastener tape affixed to said elongated strip and extending longitudinally thereof, a market bag, a complementary slide fastener tape affixed to the upper edge of said market bag and extending longitudinally thereof and a slide member coacting with said complementary slide fastener tapes to connect the two whereby said market bag may be detachably connected to said carrier member.

IRVING KANTOR.

REFERENCES CITED

The following references are of record in the file of this patent:

UNITED STATES PATENTS

| Number | Name | Date |
|---|---|---|
| 1,505,182 | Wrixton | Aug. 19, 1924 |
| 2,223,029 | Dunton | Nov. 26, 1940 |

FOREIGN PATENTS

| Number | Country | Date |
|---|---|---|
| 363,856 | France | May 15, 1906 |
| 657,324 | Germany | Mar. 2, 1938 |